Sept. 25, 1951 W. K. CARTER 2,569,226
METHOD OF PRODUCING ARTICLES FROM POWDERED MATERIAL
Filed Jan. 11, 1946 3 Sheets-Sheet 1

INVENTOR.
Willard K. Carter
BY
Herschel C. Omohundro
ATTORNEY

Sept. 25, 1951 W. K. CARTER 2,569,226
METHOD OF PRODUCING ARTICLES FROM POWDERED MATERIAL
Filed Jan. 11, 1946 3 Sheets-Sheet 2

INVENTOR.
Willard K. Carter
BY

*Herschel C. Omohundro*
ATTORNEY

Sept. 25, 1951  W. K. CARTER  2,569,226
METHOD OF PRODUCING ARTICLES FROM POWDERED MATERIAL
Filed Jan. 11, 1946  3 Sheets-Sheet 3

INVENTOR.
Willard K. Carter
BY
Herschel C. Omohundro
ATTORNEY

Patented Sept. 25, 1951

2,569,226

UNITED STATES PATENT OFFICE 2,569,226

METHOD OF PRODUCING ARTICLES FROM POWDERED MATERIAL

Willard K. Carter, Columbus, Ohio, assignor to The Denison Engineering Company, Columbus, Ohio, a corporation of Ohio Application January 11, 1946, Serial No. 640,488

4 Claims. (Cl. 18—55)

This invention relates to the art of forming articles from comminuted or disintegrated materials and is particularly directed to an improved method of and apparatus for producing articles from powdered or disintegrated materials by compaction.

Heretofore in the production of articles in this manner, considerable difficulty has been encountered in making articles, for example, tiles or similar pieces, which should have a uniform texture throughout, and be free from laminations and/or air pockets. These difficulties have multiplied with attempts at high speed production and in the use of higher pressures to obtain more dense products.

Some of the difficulties mentioned above have been due to the methods employed as well as some steps which are inherent in the art, for instance, when a mold receives the powdered material from which an article is to be formed, large amounts of air, either free air or adsorbed air, may be contained in the material. This air may be trapped in the material and when the latter is compacted, it may form pockets or it may become stratified in the article and cause laminations or honey-combing. On subsequent treatment such as heating or drying, this air may expand and tend to produce blisters or other structural defects.

An object of this invention is to provide a method of compacting powdered material which will provide for the escape of included air from the material and the production of tile or other articles characterized by their freedom from air pockets, blisters, laminations, and similar defects.

Another object of the invention is to provide a method of forming articles of powdered materials in which the material is subjected to an initial forming pressure to permit the escape of air and a series of subsequent pressures or impacts while at least a portion of the first pressure is maintained whereby additional air or other fluid will be exhausted from the material and a more dense compaction thereof will result.

A further object of the invention is to provide a method of forming articles of powdered materials in which a die is advanced into compressive engagement with a quantity of material confined in a mold, under a yieldable force and thereafter subjecting the die to a series of material compressing impacts while the yieldable force is maintained whereby air will be precluded from re-entering the material after the initial application of force.

Further objects and advantages of the present invention will be apparent from the following description, reference being had to the accompanying drawings wherein a preferred form of embodiment of the invention is clearly shown.

Figure 7:
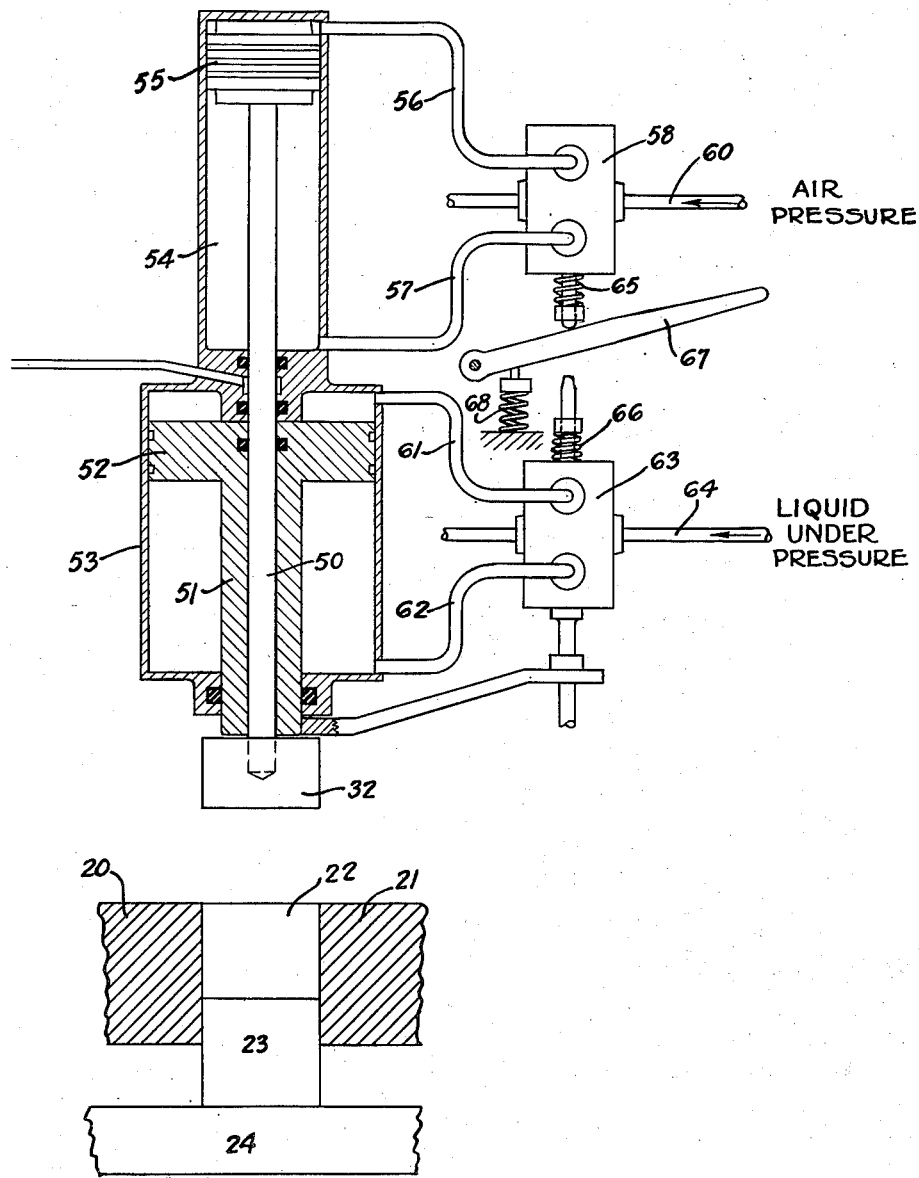

Figs. 3 to 6, inclusive, illustrate several successive steps in the operation of forming an article in accordance with the method of the present invention; and Fig. 7 is a diagrammatic view of a modified form of apparatus for carrying out the present invention.

Referring more particularly to Figs. 1 to 6, inclusive, of the drawing, the numeral 20 designates the mold. This mold may be of any suitable type and is illustrated as block 21 formed with an opening 22 extending therethrough, this opening receiving a plug 23 which forms the bottom of the mold cavity. For convenience in illustrating the invention, a mold suitable for forming tile which is rectangular in shape has been shown. It is obvious that molds for forming other shapes of tile or other articles could be employed without departing from the spirit and scope of this invention. The plug 23 is carried by a bed plate 24, and the mounting for the bed plate and/or the block 21 is such as to permit movement of these elements toward one another in order that the plug 23 may be moved completely through the block 21. The reason for such movement will be apparent from the following description.

A ram 25 is disposed for movement toward and away from the cavity 22, the ram 25 being in registration with such cavity and being moved by a suitable power transmission, hydraulic transmission being preferably employed because of the flexibility of operation and control. The lower end of the ram 25 is formed with a threaded sockets 26 for the reception of a similarly threaded projection 27 on the upper end of an adapter 28. This member is provided with a socket 30 to slidably receive a projection 31 extending from the upper end of a die 32. The latter member is used in pressing powdered, granulated or disintegrated material in the mold cavity 22 and is therefore of such size and shape that it will be slidably received in the mold cavity. If desired, the projection 31 and die 32 may be formed, as shown, from two separate pieces and threadedly united, or they may be formed from one piece, depending upon the desires of the manufacturer. Opposed sides of the projection 31 have elongated slots 33 formed therein to receive the inner end of guide screws or limit screws 34 which are removably received by the adapter 28. When the screws are properly positioned with their inner ends in the slots 33, the projection 31 is free to move back and forth in the socket 30 until the inner end of the projection 31 engages the inner end of the socket in the inward direction and until the ends of the slots 33 are engaged with the limit screws 34 in the outward direction.

Under normal conditions, the projection is held in the latter position, that is, with the innermost end of the slots 33 in engagement with the limit screws 34 by a spring 35 positioned between the projection 31 and the inner end of the socket 30. The spring 35 is received by registering sockets 36 and 37 formed in the projection 31 and the adapter 28, respectively. The spring is initially compressed to the degree necessary to perform the operations for which it is provided which are those of providing charges in the mold with initial pressure through the die 32 to extract air therefrom. Through the provision of the limit screws 34, the die 32 may be quickly and easily removed, the spring 35 removed and/or replaced, and the same or a new die inserted. The mechanism may thus be adapted to produce different articles with a minimum of time and effort. This is in marked contrast with previous apparatus which was designed for producing certain articles of certain sizes and then employed to produce other articles of a different size with a sacrifice of efficiency.

Figures 1, 2:
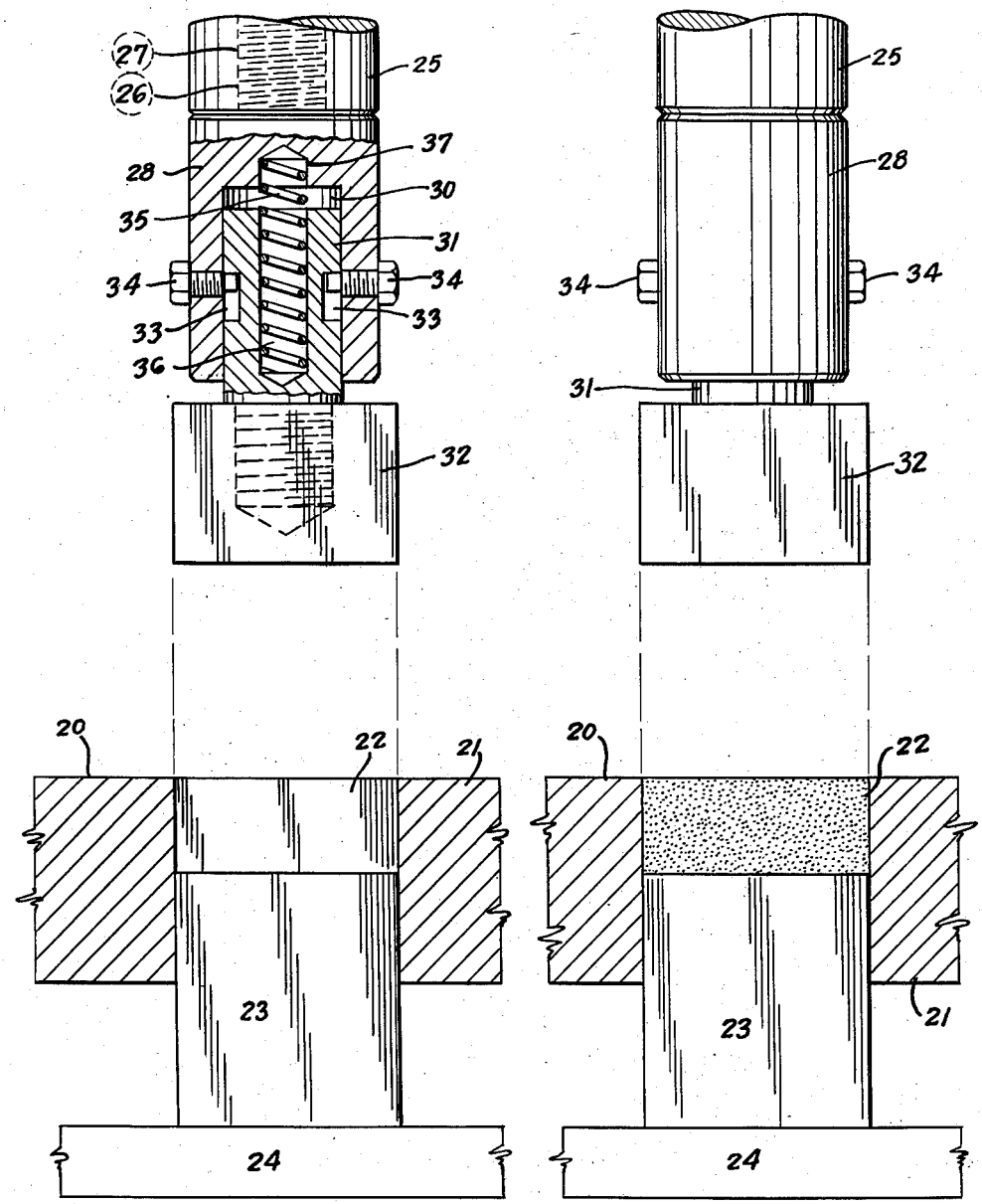
Fig. 1 is a diagrammatic view illustrating the apparatus partly in vertical section for carrying out the method of the present invention, the parts of the apparatus being shown in the position they occupy at the beginning of a cycle of operation.
Fig. 2 is a similar view with the parts shown in side elevation, the first operation, that of filling the mold, having been completed.
Figure 3:
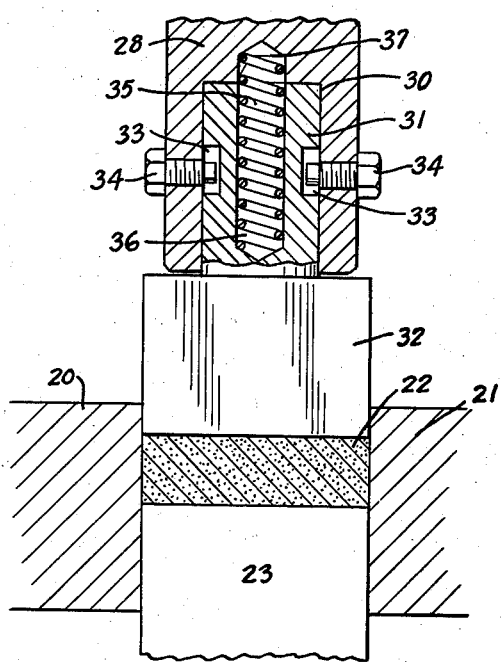
Figure 4:
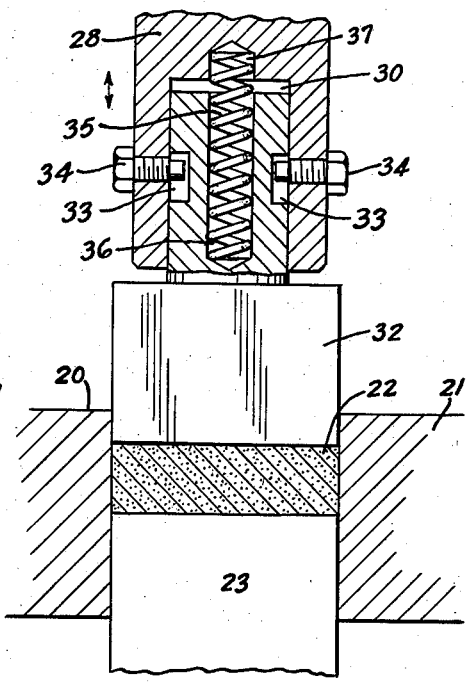
Figure 5:
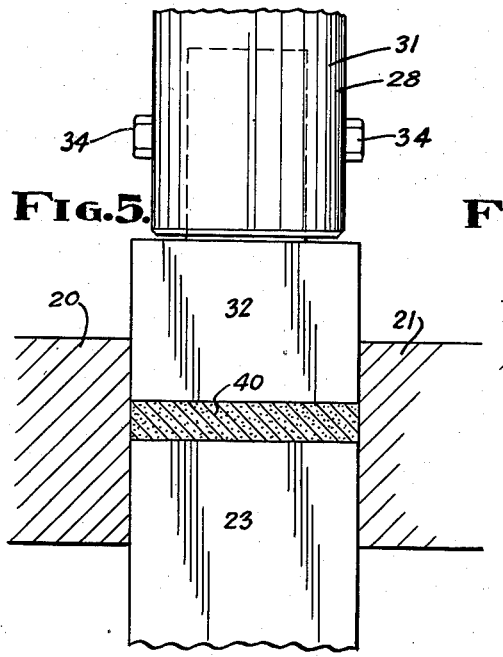
Figure 6:
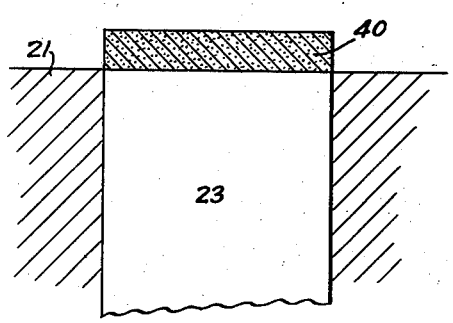

In carrying out the present invention the mold cavity 22 is charged with a quantity of the material from which the article is to be formed as shown in Fig. 2 and the ram moves toward the mold as indicated in Fig. 3. During the initial part of this operation the die 32 will enter the cavity of the mold and commence the pressing or compaction stage of the method. This initial compaction is effected under the force of the spring 35 which force may be varied by the substitution of different springs depending upon the requirements of the articles being produced. This spring force is of slight magnitude compared to the total force of the ram so that a gentle pressing force will be initially applied which will permit the escape of air entrapped in the powdered material. Continued movement of the ram serves to compress the spring 35 until the inner end of the projection 31 is engaged by the inner end wall of the socket 30 at which time the full force of the ram 25 will be applied to the material through the adapter 28 and die 32.

The mechanism selected for moving the ram 25 should be such as to permit the latter to make a series of short reciprocatory movements after the initial pressing operation. If power is applied to the ram 25 through a hydraulic transmission, this apparatus may be controlled by mechanism such as is shown in the copending application of Cecil E. Adams, Serial No. 556,182, filed September 28, 1944, now Patent No. 2,527,051 or the valve illustrated in the copending application of Cecil E. Adams, Serial No. 594,963, filed May 16, 1945, now Patent No. 2,512,730. Regardless of the mechanism employed to reciprocate the ram, the length of reciprocation should be limited so that the inner end of the limit screws 34 will not engage the ends of the slots 33 and the die 32 will thus remain pressed against the material in the mold under the influence of the force of the spring 35. The ram operating mechanism should be such as to permit the ram and the die to follow the material as it is being compressed and apply a series of pressing impulses or impacts to the material under the full force of the ram. While this force may vary considerably, depending upon the article being manufactured, it is proposed to use a ram force of the order of 4000 to 6000 pounds. After the material has been compressed to the desired degree, the ram is returned to its starting position, thus moving the die 32 out of the mold. As this operation is carried out or immediately thereafter, the block 21 and the plate 24 are moved toward one another to force the plunger 23 into the mold cavity and eject the finished article 40 therefrom. This article may then be removed from the upper end of the plunger 23 which will then be lowered to the position shown in Fig. 1 by moving the block 21 away from the plate 24 and the parts will thus be in position for another cycle of operation.

It will be obvious from the foregoing that a mechanism has been provided for carrying out the method of forming articles from powdered or disintegrated materials which will include the steps of charging the mold with the powdered material, advancing a die into the mold under a yieldable force, which force initially compresses the material so gently that the air entrained therein may escape, and then applying a series of impacts at a greatly increased force while the initial pressure is maintained, after which the formed article is ejected from the mold. This method is in marked contrast to other methods wherein the die is forcibly moved into engagement with the powdered material to form the article and then the latter is ejected. With such prior methods the air in the material was not permitted to escape but was compressed in the article, thus forming voids, or which expanded during the later treatment of the article, causing the same to blister. When the die is maintained under the yieldable force between the successive impacts, air is prevented from reentering the material and being compressed therein during a subsequent pressing operation or impact.

The method may also be carried out by the mechanism diagrammatically illustrated in Fig. 7. In this figure use is made of the same mold 20 which includes the block 21, the cavity 22, bottom plunger 23, and bolster plate 24. Die 32 is also employed, but this die is carried by the lower end of the rod 50, which projects through the ram 51, and its piston 52, through the top wall of the power cylinder 53 and into a second power cylinder 54, the upper end of this rod being provided with a piston 55 having a smaller cross sectional area than the piston 52. The ends of the power cylinder 54 are connected by conduits 56 and 57 to the cylinder ports of a four-way valve 58 to which air under pressure is applied from any suitable source through a conduit 60.

The ends of the power cylinder 53 are also connected by conduits 61 and 62 with the cylinder ports of a four-way valve 63 to which liquid under pressure is supplied through conduit 64. The valve 63 may be of any suitable type such as that shown in the copending application of Cecil E. Adams, Serial No. 594,963, or it may be operated by the mechanism shown in the other copending Adams case cited above. For convenience in illustration, the valve 58 is shown biased toward an "on" position, that is, to effect movement of the piston 55 toward a pressing position, by a spring 65, while the valve 63 is shown as being urged toward an "off" position or one in which the piston 52 of the power cylinder for the ram 51 is urged toward a ram elevating position, by a spring 66. An actuating lever is disposed for swinging movement between the adjacent ends of the valve operating elements and is biased toward an upper position by a coil spring 68 having sufficient strength to overcome the spring 65.

In the operation of the mechanism shown in Fig. 7, the lever 67 is moved downwardly, permitting the spring 65 to open the valve 58 to admit air pressure to the upper end of power cylinder 54. This air pressure on the upper end of the piston 55 will force this member downward causing the die 32 at the lower end of the rod 59 to enter the mold 22 and apply pressing force to material therein. The air pressure selected as well as the area of the piston 55 will be such as to approximate the force of the spring 35 used in the first form of the invention described. It will be obvious that by varying the air pressure, the apparatus may be adapted for use with dies of different sizes. Due to the mounting of the lever 67 between the valves 58 and 63, the valve 58 will be first operated, thus permitting the die 32 to enter the mold cavity after which the continued movement of the lever 67 will open the valve 63 to supply liquid under pressure to the upper end of power cylinder 53. The admission of fluid pressure to this end of the power cylinder will cause the ram 51 to descend and strike the upper surface of the die 32 to impart an impulse thereto which will be transmitted to the material in the mold. It should be obvious that since the rod 59 and the ram 51 are moved by independent power devices, the die may be held in engagement with the material in the mold while one or more impacts may be transmitted to such material by the ram 51. Upon sufficient compaction of the material, the lever 67 is raised to permit spring 66 to move the operating member of valve 63 to an "off" position wherein fluid under pressure will be supplied to the lower end of the power cylinder to cause the piston 52 to move in an upward direction. Continued upward movement of the lever 67 will move the operating element of the valve 58 upwardly thus admitting air to the lower end of power cylinder 54 which will in turn elevate piston 55 causing die 32 to be withdrawn from the mold cavity. The formed article may then be removed from the mold by moving the block 21 and plate 24 toward one another. After these elements are again separated, the mechanism is in condition for another cycle of operation.

With either form of apparatus shown and described, articles such as tiles may be formed from powdered material without containing air pockets or voids or without the laminations frequently found in such articles.

While the form of embodiment of the present invention as herein disclosed constitutes a preferred form, it is to be understood that other forms might be adopted, all coming within the scope of the claims which follow.

I claim:

1. The method of forming articles from powdered plastic materials comprising the steps of filling a mold cavity with the powdered material, advancing a die into the mold to initially press the material with a yieldable force, applying a material compacting thrust to said die with a positive force of greater magnitude than the yieldable force, withdrawing the die from said mold, and removing the formed article.

2. The method of forming articles from powdered ceramic materials comprising the steps of introducing the material into a mold cavity; advancing a die into the mold to initially press the material with a yieldable force; maintaining the die in material pressing engagement under such yieldable force; superimposing a series of material compacting thrusts to said material through said die with a positive force of greater magnitude than the yieldable force while the latter is maintained; and removing the formed article.

3. The method of forming articles from disintegrated ceramic materials comprising the steps of supplying a mold cavity with the material; moving a die into engagement with the material in the mold cavity with a yieldable force; holding the die in engagement with the materials with such yieldable force; and repeatedly imparting material-compacting thrusts to said die with a positive force of greater magnitude than the yieldable force.

4. The method of forming articles from disintegrated ceramic material comprising the steps of placing a quantity of the material in a mold cavity; moving a die into pressing engagement with the material in the mold cavity with a yieldable force of predetermined magnitude; maintaining the die in such pressing engagement; and imparting a series of material-compacting thrusts to the die with a positive force of greater magnitude than the first force while the material pressing engagement of the die is being yieldably maintained.

WILLARD K. CARTER.

REFERENCES CITED

The following references are of record in the file of this patent:

UNITED STATES PATENTS

| Number | Name | Date |
|---|---|---|
| 1,044,617 | Wray et al. | Nov. 19, 1912 |
| 1,605,096 | Campbell | Nov. 2, 1926 |
| 1,770,303 | Enticknap | July 8, 1930 |
| 1,793,435 | Bradley | Feb. 17, 1931 |
| 1,814,416 | Stoney | July 14, 1931 |
| 2,036,466 | Ellis | April 7, 1936 |
| 2,046,750 | Mason et al. | July 7, 1936 |
| 2,067,401 | Lassman | Jan. 12, 1937 |
| 2,150,097 | Gunderson | Mar. 7, 1939 |
| 2,160,805 | Winegar | June 6, 1939 |
| 2,215,244 | Linzell | Sept. 17, 1940 |
| 2,336,982 | Cremer | Dec. 14, 1943 |
| 2,367,242 | Stacy | Jan. 16, 1945 |
| 2,381,272 | Fischer | Aug. 7, 1945 |